US008280800B2

(12) United States Patent
Samsky et al.

(10) Patent No.: US 8,280,800 B2
(45) Date of Patent: Oct. 2, 2012

(54) SYSTEM AND METHOD FOR AN EXCHANGE OF FINANCIAL INSTRUMENTS

(75) Inventors: Brett M. Samsky, Atlanta, GA (US);
Jason S. Williams, Braselton, GA (US);
Steve Stewart, Las Vegas, NV (US);
Malin Eriksson, São Paulo (BR)

(73) Assignee: Credigy Technologies, Inc. NV (US)

( * ) Notice: Subject to any disclaimer, the term of this patent is extended or adjusted under 35 U.S.C. 154(b) by 0 days.

(21) Appl. No.: 12/718,412

(22) Filed: Mar. 5, 2010

(65) Prior Publication Data

US 2010/0161475 A1    Jun. 24, 2010

Related U.S. Application Data

(63) Continuation of application No. 11/095,749, filed on Mar. 31, 2005, now Pat. No. 7,742,973.

(51) Int. Cl.
*G06Q 40/00* (2006.01)
(52) U.S. Cl. ............................................. 705/37; 705/38
(58) Field of Classification Search ............... 705/37–40
See application file for complete search history.

(56) References Cited

U.S. PATENT DOCUMENTS

| 5,644,727 | A  | 7/1997  | Atkins   |
|-----------|----|---------|----------|
| 5,875,437 | A  | 2/1999  | Atkins   |
| 5,893,079 | A  | 4/1999  | Cwenar   |
| 6,012,042 | A  | 1/2000  | Black    |
| 6,073,117 | A  | 6/2000  | Oyanagi  |
| 6,131,087 | A  | 10/2000 | Luke     |
| 6,141,653 | A  | 10/2000 | Conklin  |
| 6,233,566 | B1 | 5/2001  | Levine   |
| 6,317,728 | B1 | 11/2001 | Kane     |
| 6,366,925 | B1 | 4/2002  | Meltzer  |
| 6,484,153 | B1 | 11/2002 | Walker   |
| 6,560,580 | B1 | 5/2003  | Fraser   |
| 6,574,608 | B1 | 6/2003  | Dahod    |
| 6,601,044 | B1 | 7/2003  | Wallman  |

(Continued)

FOREIGN PATENT DOCUMENTS

AU    2006233098    9/2007

(Continued)

OTHER PUBLICATIONS

Bruce M. McLaren, Philip J. Hayes and Aidan J. McKenna, Intelligent Trading Networks: Peer-to-Peer Trading in a Distribution Marketplace, International Conference on Internet Computing, Las Vegas, NV, Jun. 25-29, 2001 (8 pages).

Christoph Quix and Mareike Schoop, Facilitating Business-to-Business Electronic Commerce for Small and Medium-Sized Enterprises, Electronic Commerce and Web Technologies, First International Conference, EC-Web 2000, London, UK, Sep. 4-6, 2000, Proceedings (pp. 442-451).

(Continued)

*Primary Examiner* — Thu Thao Havan
(74) *Attorney, Agent, or Firm* — Ballard Spahr, LLP

(57) ABSTRACT

Provided is a method and system for an online marketplace for the buying, selling and Servicing of financial instruments, such as accounts receivable, where the online marketplace receives and analyzes Account data from a Reporting Agency Database, such as a Consumer Reporting Agency Database. The online marketplace may include a plurality of business logic Components, including an Analysis Component, an Inventory Management Component, an Offer Component, a Transaction Component, a Post-Transaction Component, a Receivables Management Knowledge Base and a Servicing Component. The Receivables Management Knowledge Base applies industry rules and regulations to the data. Users of the online marketplace may be Account Owners, Buyers, sellers, Servicers and the like. Users flag Accounts in the Consumer Reporting Agency database to be placed for sale on the online marketplace. Users may also define Selection Criteria for automatic buying, automatic selling, alerts or other such business rules.

19 Claims, 11 Drawing Sheets

U.S. PATENT DOCUMENTS

| | | |
|---|---|---|
| 6,708,174 B1 | 3/2004 | Tenorio |
| 6,751,597 B1 | 6/2004 | Brodsky |
| 6,778,968 B1 | 8/2004 | Gulati |
| 6,795,071 B2 | 9/2004 | Tracey |
| 6,839,686 B1 | 1/2005 | Galant |
| 6,847,938 B1 | 1/2005 | Moore |
| 6,856,967 B1 | 2/2005 | Woolston |
| 6,868,389 B1 | 3/2005 | Wilkins |
| 6,868,400 B1 | 3/2005 | Sundaresan |
| 7,133,935 B2 | 11/2006 | Hedy |
| 7,389,263 B2 | 6/2008 | Gladstone |
| 7,401,050 B2 | 7/2008 | O'Neill |
| 7,433,842 B2 | 10/2008 | Toffey |
| 7,742,973 B2 | 6/2010 | Samsky |
| 2002/0059139 A1 | 5/2002 | Evans |
| 2002/0138380 A1 | 9/2002 | Naismith |
| 2003/0018563 A1 | 1/2003 | Kilgour |
| 2003/0216932 A1 | 11/2003 | Foley |
| 2004/0044607 A1 | 3/2004 | Hedrick |
| 2004/0059653 A1 | 3/2004 | Verkuylen |
| 2004/0143525 A1 | 7/2004 | Nishimaki |
| 2004/0230512 A1 | 11/2004 | Gulati |
| 2004/0236668 A1* | 11/2004 | Toffey .............................. 705/37 |

FOREIGN PATENT DOCUMENTS

| | | |
|---|---|---|
| EP | 2006720973 | 9/2007 |
| JP | 2004213642 | 7/2004 |
| JP | 2008504055 | 9/2007 |
| JP | 2008504055 | 2/2008 |
| WO | WO/96/41293 | 12/1996 |
| WO | WO/97/45802 | 12/1997 |
| WO | WO/98/44444 | 10/1998 |
| WO | WO/98/58333 | 12/1998 |
| WO | WO/99/28845 | 6/1999 |
| WO | WO/00/55754 | 9/2000 |
| WO | 2006/006250 | 2/2006 |
| WO | WO/2006/107448 | 10/2006 |

OTHER PUBLICATIONS

Christian Facciorusso, Simon Field, Rainer Hauser, Yigal Hoffner, Robert Humbel, Rene Pawlitzek, Walid Rjaibi and Christine Siminitz, A Web Services Matchmaking Engine for Web Services, Electronic Commerce and Web Technologies, Fourth International Conference, EC-Web, Prague, Czech Republic, Sep. 2-5, 2003, Proceedings (pp. 37-49).

Pamar Collection System™, Pamar Revenue Recovery Systems, www.pamarsystems.com/pamar.html, (2 pages).

Debt$Net PC-Based Collection Software, The Computer Manager, Inc., www.debtnet5.com/html/features.htm, (6 pages).

Technology, Agency of Credit Control, www.getitpaid.com/technology.htm, (3 pages).

International Preliminary Report on Patentability issued Oct. 3, 2007 for PCT/US2006/006250 filed on Feb. 22, 2006, which published as WO/2006/107448 on Oct. 12, 2006 (Inventors: Samsky, Brett, M., et al. // Applicants: Credigy Technologies, Inc., et al.) (8 pages).

Written Opinion mailed Aug. 9, 2007 for PCT/US2006/006250 filed on Feb. 22, 2006, which published as WO/2006/107448 on Oct. 12, 2006 (Inventors: Samsky, Brett, M., et al. // Applicants: Credigy Technologies, Inc., et al.) (7 pages).

International Search Report mailed Aug. 9, 2007 for PCT/US2006/006250 filed on Feb. 22, 2006, which published as WO/2006/107448 on Oct. 12, 2006 (Inventors: Samsky, Brett, M., et al. // Applicants: Credigy Technologies, Inc., et al.) (3 pages).

Supplementary European Search Report completed on Oct. 14, 2009 for corresponding application No. 06720973 (PCT/US2006/006250 filed on Feb. 22, 2006, which published as WO/2006/107448 on Oct. 12, 2006) (Inventors: Samsky, Brett, M., et al. // Applicants: Credigy Technologies, Inc., et al.) (2 pages).

Issue Notification issued Jun. 22, 2010 for U.S. Appl. No. 11/095,749 filed on Mar. 31, 2005 (Inventors: Samsky, Brett, M., et al.) (1 page).

Notice of Allowance and Fees Due mailed Dec. 4, 2009 for U.S. Appl. No. 11/095,749 filed on Mar. 31, 2005 (Inventors: Samsky, Brett, M., et al.) (6 pages).

Amendment Submitted and Applicant Arguments dated May 29, 2009 for U.S. Appl. No. 11/095,749 filed on Mar. 31, 2005 (Inventors: Samsky, Brett, M., et al.) (21 pages).

Final Rejection mailed Jan. 7, 2009 for U.S. Appl. No. 11/095,749 filed on Mar. 31, 2005 (Inventors: Samsky, Brett, M., et al.) (9 pages).

Response to Office Action dated Sep. 25, 2008 for U.S. Appl. No. 11/095,749 filed on Mar. 31, 2005 (Inventors: Samsky, Brett, M., et al.) (25 pages).

Non-Final Rejection mailed Jun. 25, 2008 for U.S. Appl. No. 11/095,749 filed on Mar. 31, 2005 (Inventors: Samsky, Brett, M., et al.) (8 pages).

Preliminary Amendment entered by the US Patent Office on Jul. 25, 2007 for U.S. Appl. No. 11/095,749 filed on Mar. 31, 2005 (Inventors: Samsky, Brett, M., et al.) (18 pages).

Specification, Claims, Abstract, and Drawings entered by the US Patent Office on Mar. 31, 2005 for U.S. Appl. No. 11/095,749 filed on Mar. 31, 2005 (Inventors: Samsky, Brett, M., et al.) (48 pages).

Processing of an appeal by the European Patent Office on Feb. 6, 2012 for European Patent Application No. 06720973, which was filed on Sep. 27, 2007 (Inventors: Samsky, Brett, M., et al. // Applicants: Credigy Technologies, Inc., et al.) (2 pages).

Statement of Grounds of Appeal sent Feb. 1, 2012 for European Patent Application No. 06720973, which was filed on Sep. 27, 2007 (Inventors: Samsky, Brett, M., et al. // Applicants: Credigy Technologies, Inc., et al.) (42 pages).

Notice of Appeal dated Nov. 21, 2011 for European Patent Application No. 06720973, which was filed on Sep. 27, 2007 (Inventors: Samsky, Brett, M., et al. // Applicants: Credigy Technologies, Inc., et al.) (1 page).

Decision to Refuse the Application by the Examining Division dated Sep. 22, 2011 for European Patent Application No. 06720973, which was filed on Sep. 27, 2007 (Inventors: Samsky, Brett, M., et al. // Applicants: Credigy Technologies, Inc., et al.) (31 pages).

Minutes of the Oral Proceedings of the Examining Division dated Sep. 22, 2011 for European Patent Application No. 06720973, which was filed on Sep. 27, 2007 (Inventors: Samsky, Brett, M., et al. // Applicants: Credigy Technologies, Inc., et al.) (4 pages).

Result of Consultation by telephone/in person dated Jun. 24, 2011 for European Patent Application No. 06720973, which was filed on Sep. 27, 2007 (Inventors: Samsky, Brett, M., et al. // Applicants: Credigy Technologies, Inc., et al.) (6 pages).

Amended Claims and Written Submission for oral proceedings dates May 27, 2011 for European Patent Application No. 06720973, which was filed on Sep. 27, 2007 (Inventors: Samsky, Brett, M., et al. // Applicants: Credigy Technologies, Inc., et al.) (62 pages).

Summons to attend oral proceedings dated Apr. 4, 2011 for oral proceedings dates May 27, 2011 for European Patent Application No. 06720973, which was filed on Sep. 27, 2007 (Inventors: Samsky, Brett, M., et al. // Applicants: Credigy Technologies, Inc., et al.) (46 pages).

Reply to communication from the Examining Division dated Jun. 2, 2010 for European Patent Application No. 06720973, which was filed on Sep. 27, 2007 (Inventors: Samsky, Brett, M., et al. // Applicants: Credigy Technologies, Inc., et al.) (10 pages).

European search opinion entered at the European Patent Office on Oct. 23, 2009 for European Patent Application No. 06720973, which was filed on Sep. 27, 2007 (Inventors: Samsky, Brett, M., et al. // Applicants: Credigy Technologies, Inc., et al.) (5 pages).

Amendments received before examination dated Sep. 27, 2007 for European Patent Application No. 06720973, which was filed on Sep. 27, 2007 (Inventors: Samsky, Brett, M., et al. // Applicants: Credigy Technologies, Inc., et al.) (5 pages).

Information on entry into European phase dated Aug. 20, 2007 for European Patent Application No. 06720973, which was filed on Sep. 27, 2007 (Inventors: Samsky, Brett, M., et al. // Applicants: Credigy Technologies, Inc., et al.) (3 pages).

Examiner's First Report sent Aug. 27, 2010 for Australian Patent Application No. 2006233098, which was filed on Sep. 12, 2007 (Inventors: Samsky, Brett, M., et al. // Applicants: Credigy Technologies, Inc., et al.) (1 page).

* cited by examiner

Selection Criteria Process

Selection Flag Process

Commitment Process

Post-Transaction Support Process ical instruments, such as stocks, bonds and mutual funds. Computer systems can provide an efficient means for carrying out the business processes associated with financial instruments. When computer systems are connected over general purpose networks such as the Internet, multiple entities can efficiently communicate about and transact for financial instruments within the scope of such networked computer systems to form an online market. Such online markets, like NASDAQ®, are similar to traditional brick and mortar financial markets. Recently, specialized online markets for the purchase and sale of certain categories of non-performing financial instruments, or distressed debt, have emerged.

SYSTEM AND METHOD FOR AN EXCHANGE OF FINANCIAL INSTRUMENTS

CROSS REFERENCE TO RELATED APPLICATION

This application is a continuation application filed under 37 CFR 1.53(b) and 35 USC 120 and claims benefit of and priority to U.S. patent application Ser. No. 11/095,749, filed Mar. 31, 2005 now U.S. Pat. No. 7,742,973, which is fully incorporated herein by reference and made a part hereof.

BACKGROUND AND SUMMARY

1. Field

The present invention relates to systems and methods for facilitating exchanges of financial instruments, and more particularly to systems and methods for facilitating online transactions for accounts receivable.

2. Background

It is common practice to use computer systems for the analysis, purchase, sale and management of financial instruments, such as stocks, bonds and mutual funds. Computer systems can provide an efficient means for carrying out the business processes associated with financial instruments. When computer systems are connected over general purpose networks such as the Internet, multiple entities can efficiently communicate about and transact for financial instruments within the scope of such networked computer systems to form an online market. Such online markets, like NASDAQ®, are similar to traditional brick and mortar financial markets. Recently, specialized online markets for the purchase and sale of certain categories of non-performing financial instruments, or distressed debt, have emerged.

Specialized online distressed debt exchanges may facilitate both primary and secondary markets. The primary market processes transactions between the originators of financial instruments and the purchasers or servicers of those instruments, while the secondary market processes transactions in financial instruments between investors and between investors and servicers. Typically, the categories of financial instruments available in such specialized, online distressed debt exchanges may include, but are not limited to, charged off consumer credit card receivables, automobile loan deficiency receivables and mortgage loan deficiency receivables.

Traditionally, investors in the primary and secondary distressed debt markets have transacted in large groupings of financial instruments, known as portfolios, either directly or through a brokerage system. The advent of specialized, online distressed debt exchanges has catalyzed a trend towards transacting for smaller groupings of financial instruments, and in some cases individual instruments, in addition to large portfolios. For example, a buyer may wish to purchase financial instruments within a certain zip code.

The known specialized, online distressed debt exchanges traditionally offer financial instruments for sale in both set-price and auction formats. Additionally, it is known in the art for an online marketplace to suggest a price of an instrument based on market information and link to third-party entities such as brokerages, due diligence servicers and collection servicers. Also known in the art is the practice of analyzing the financial instruments for sale and assigning ratings to certain parameters. These ratings can assist all users of the online marketplace in sorting and ranking financial instruments.

Sellers of financial instruments on these known specialized, online distressed debt exchanges may have to enter their account information manually, which can be time consuming and introduce human error. In other exchanges, sellers may simply be able to post the description of an account or portfolio, or transfer account information in batch. Additionally, the system users may only trade with the few other users of these known exchanges.

Consumer debt is currently tracked by consumer reporting agencies (CRAs), such as Equifax®, Experian® and Trans Union®. These CRAs have created vast databases of consumer credit information, including specific categories of data regarding particular financial instruments related to particular consumers on a current and historic basis. It is commonly known in the art to query this database through known means, most commonly name, address and social security number, to learn about consumer debt and calculated consumer credit ratings.

Currently there is no online marketplace for financial instruments that facilitates transactions for accounts utilizing account data already stored within a CRA database, or other such industry-wide database. Additionally, there is no such online marketplace that offers a knowledge base of accounts receivable laws, rules and regulations to evaluate transactions. Also, there is no current method for rapidly creating critical mass for such a market and injecting liquidity into such a market by lowering barriers to entry, in particular high transaction costs arising from current market inefficiency and the high level of expertise required to process a transaction.

Therefore, there exists a need for an online marketplace that allows users to transact for accounts based on their account data already housed in a CRA datastore. Additionally, there is a need for an easy method of consolidation of accounts from multiple sources to facilitate servicing efficiency. Such a marketplace would attract a large number of users, providing all users with a broader range of transactions than currently available. Additionally, such a marketplace would inject liquidity into the exchange of accounts receivable by reducing transaction costs and limiting the level of subject matter expertise currently required to process such transactions. There is a need in the market for such an online marketplace that also analyzes the account data with respect to a knowledge base of accounts receivable laws, rules and regulations.

SUMMARY

The present invention meets the needs in the market by providing an Online Marketplace that allows System Users to buy, sell, place for service, accept for service and manage Accounts based on their Account Data already housed in a reporting agency database, such as a Consumer Reporting Agency (CRA) Account Database. Such an Online Marketplace may provide an industry-wide view of available purchase, sale and Servicing opportunities and provide a low cost exchange for smaller Transactions.

Additionally, the present invention provides an Online Marketplace that analyzes the Account Data with respect to a Receivables Management Knowledge Base of accounts receivable laws, rules and regulations and transactional activity of Accounts on the Online Marketplace. The availability of a Receivables Management Knowledge Base and transactional data, along with the ease of the Transaction process of the present invention, may also lower any expense and expertise barriers associated with a market such as the secondary debt market. As a result, the number of Transactions in the secondary debt market may increase, which in turn may increase the liquidity of such a market.

One exemplary embodiment provides an Online Marketplace that utilizes the Account Data in an existing CRA Account Database. The CRA Account Database includes Account Data updated on a periodic basis by credit grantors and their agents, some of which are System Users. In this exemplary embodiment, the Account Data in the CRA Account Database may be periodically transferred electronically to an Account Database of the Online Marketplace such that the Account Data of the Account Database of the Online Marketplace is not personally identifiable but is related to the Account Data in the CRA Account Database by one or more unique identifiers. In alternative embodiments, the CRA Account Database may store all of the Account Data and all related Transaction Data from the exchange of the present invention.

Advantageously, a System User who is already submitting data to a CRA may simply designate certain of those Accounts to appear in the Online Marketplace of the present invention.

A System User of the Online Marketplace may be any entity, approved by the System Operator of the Online Marketplace, that participates in the buying, selling or Servicing of Accounts on the Account Database of the Online Marketplace. A System User may have multiple, simultaneous roles in the Online Marketplace; for example, an Owner may also be a Buyer and Seller. A System User accesses the Online Marketplace through a Market Interface using a general purpose computing device over a communications network. In alternative embodiments, a System User may access the Online Marketplace either through a separate interface or through a web interface provided by the CRA to submit data.

In this exemplary embodiment, a System User of the Online Marketplace defines certain Selection Criteria on the Market Interface according to each role the System User has in the Online Marketplace. Once a System User with a role of Owner or Seller defines the Selection Criteria, the Analysis Component of the Online Marketplace receives inputs of Account Data from the Account Database. The Account Data is evaluated by the Analysis Component with respect to certain Parameters, and the Analysis Component associates Ratings with the Parameters. The Analysis Component evaluates Account Data according to the Selection Criteria of each Owner or Seller and generates Selection Flags relative to each Account. The Selection Flags are updated to the Account Database by the Analysis Component. Collectively, the Selection Flags identify the plurality of Accounts that are recommended for Commitment to the Online Marketplace for a Transaction for the particular Owner or Seller. According to the values expressed in the Selection Flags, the Accounts recommended for Commitment may be automatically Committed to the Online Marketplace by the Inventory Management Component or presented to the System User for manual Commitment through the Market Interface by the Inventory Management Component.

Once a System User with a role of Buyer or Servicer defines Selection Criteria, the Analysis Component of the Online Marketplace receives inputs of Account Data from the Account Database. The Account Data is evaluated by the Analysis Component according to the Selection Criteria and Selection Flags are generated relative to each Account. The Selection Flags are updated to the Account Database by the Analysis Component. Collectively, the Selection Flags identify the plurality of Accounts which are recommended for Transactions for the particular Buyer or Servicer. According to the values expressed in the Selection Flags, the Offer Component may automatically generate an Offer to the relevant Seller or Owner of the Account through the Market Interface or present the Accounts for manual Offer generation through the Market Interface to the Buyer or Servicer. The Offer Component updates the Offers to the Account Database.

According to this exemplary embodiment, Selection Criteria may include, but are not limited to: Parameters available in the Account Database; aggregate, calculated Parameters derived from the Account Database or market activity; and a set of Parameters available in a Receivables Management Knowledge Base. An example of a Parameter that may be available in the Account Database is the current balance of any particular Account. Thus, Selection Criteria may be defined to include Accounts that have a current balance within a certain range. An example of an aggregate, calculated Parameter may include the fair market value of similarly situated Accounts based on recent Transaction activity in the Online Marketplace. Thus, Selection Criteria may be defined to include Accounts that have a fair market value within a certain range. An example of a Parameter available in a Receivables Management Knowledge Base may include the statute of limitations relative to a particular asset classification of an Account and geographic location of the debtor of the Account. Accordingly, Selection Criteria may be defined to include Accounts that are a within a certain period of time before the expiration of the applicable statute of limitations. The inclusion of a Receivables Management Knowledge Base allows System Users to make more informed and strategic decisions on the Online Marketplace.

Advantageously, to enable Potential Consolidation, a System User may define Selection Criteria which consolidates multiple Accounts based on a particular Parameter or set of Parameters. For example, a Buyer may define a Selection Criteria which generates Selection Flags for Accounts which share the same Account debtor, but which have different Sellers.

Also advantageously, to prevent manipulation of the Online Marketplace, in this exemplary embodiment a Commitment is required from Sellers and Owners when Accounts are placed in the Online Marketplace. For example, by Committing Accounts to the Online Marketplace, a Seller agrees to a calculated maximum price upon which the Seller may refuse the Offer of a Buyer, in order to prevent Sellers from using the Online Marketplace to simply gather market intelligence.

In this exemplary embodiment, the maximum price upon which a Seller may refuse to accept the Offer of a Buyer is calculated by the Analysis Component based on recent Transactions for similarly situated Accounts in the Online Marketplace. In alternative embodiments, the value may be set by the System Operator. Such conditions attempt to limit unfair trading practices and user abuse.

Offers are either: (i) automatically accepted to the extent the price upon which a Seller will automatically accept an Offer is offered, or a Servicing fee less than or equal to the maximum Servicing fee defined by an Owner is offered; or (ii) presented through the Market Interface for System User review and actioning. Once an Offer is accepted, the Acceptance is updated to the Account Database. The Transaction Component monitors the Account Database for accepted Offers. When an Offer is accepted, the Transaction Component facilitates settlement of the purchase price in the case of an Account being sold. In the case of a sale or placement for Servicing, the Transaction Component monitors the Account Database for accepted Offers and facilitates the exchange of any additional Account Data required for Transaction while updating the Account Database based on the Transaction.

Advantageously, subsequent to a Transaction, parties to a Transaction can interact through the Post-Transaction Support Component and Market Interface to attempt to resolve Post-Transaction issues, such as media management, put-back accounts, trailing payments, inventory reconciliations, consent issues, contract conditions monitoring, chain of title and the like.

Additionally, the method and system of the present invention may allow a System User to successfully navigate the treacherous landscape of regulatory laws impacting the analysis of Account Data by providing a Receivables Management Knowledge Base.

Also advantageously, Owners and Sellers may transfer personally identifiable data from the Account Database of the Owner or Seller to an external Servicing Component, such as an Application Service Provider (ASP) Servicing Component, for the benefit of a Buyer or Servicer, to facilitate Servicing or the like.

The foregoing has broadly outlined some of the aspects and features of the present invention, which should be construed to be merely illustrative of various potential applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

DESCRIPTION OF THE DRAWINGS

Brief Description of the Drawings

The accompanying drawings, which are incorporated in and constitute a part of this specification, illustrate embodiments of the invention, and together with the following detailed description, serve to explain the principles of the invention.

Figure 1:
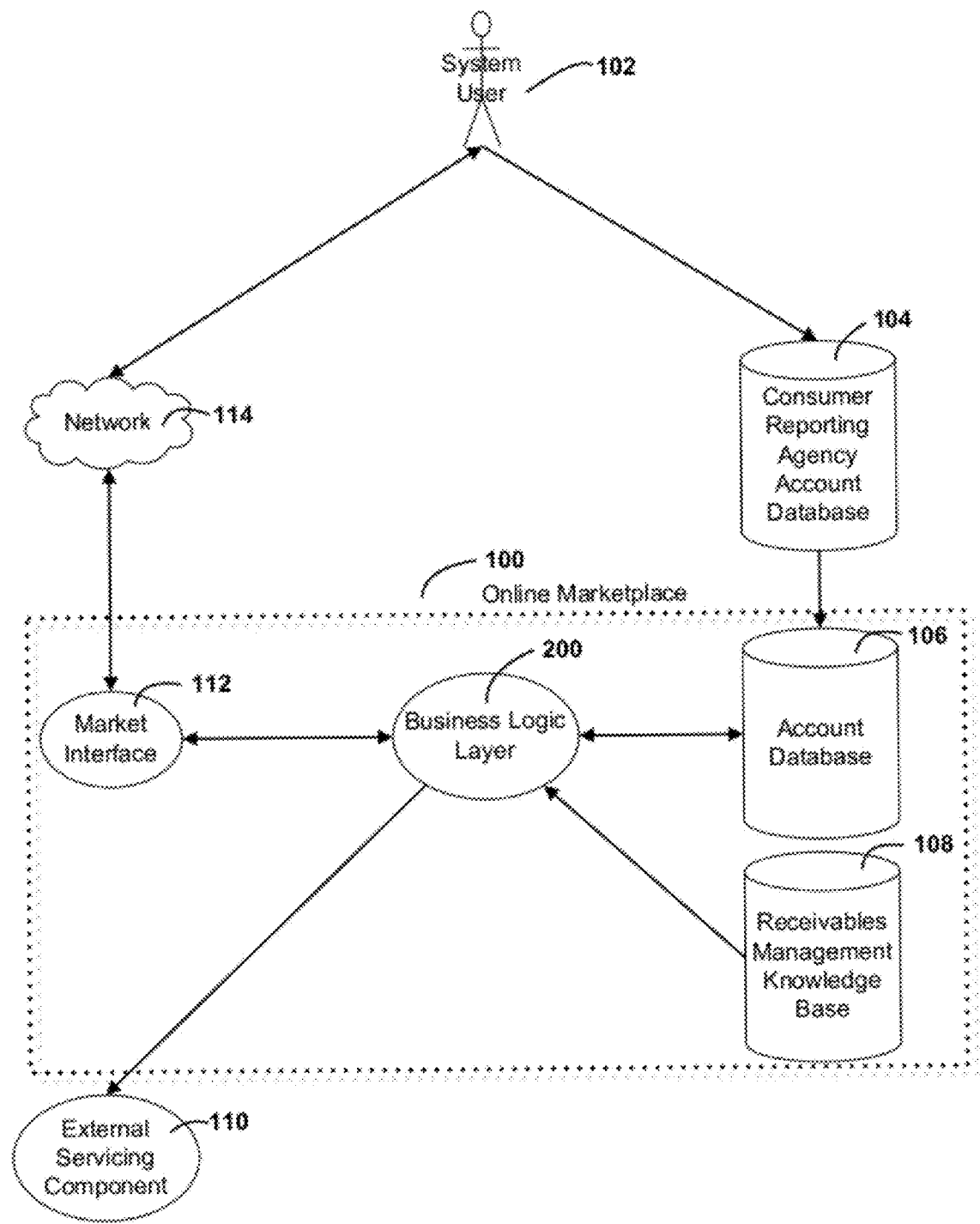

FIG. 1 depicts the basic context and structure of an Online Marketplace connected to a Consumer Reporting Agency Database.

Figure 2:
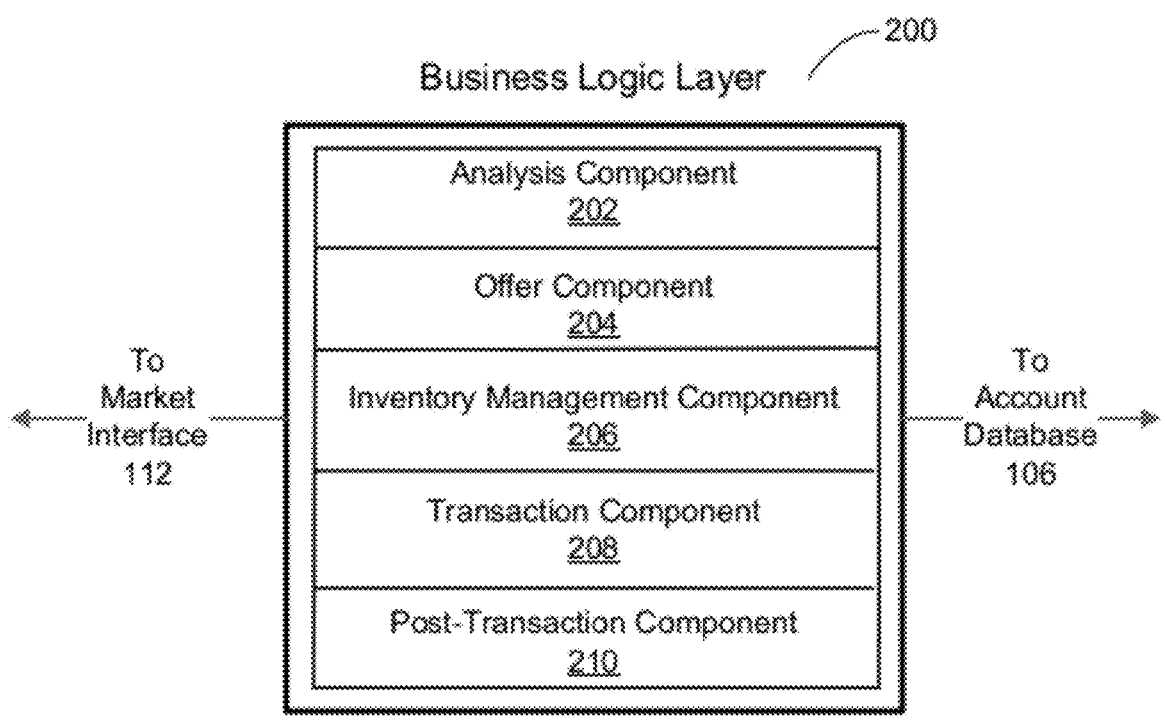

FIG. 2 further illustrates the Components of the Business Logic Layer of FIG. 1.

Figure 3:
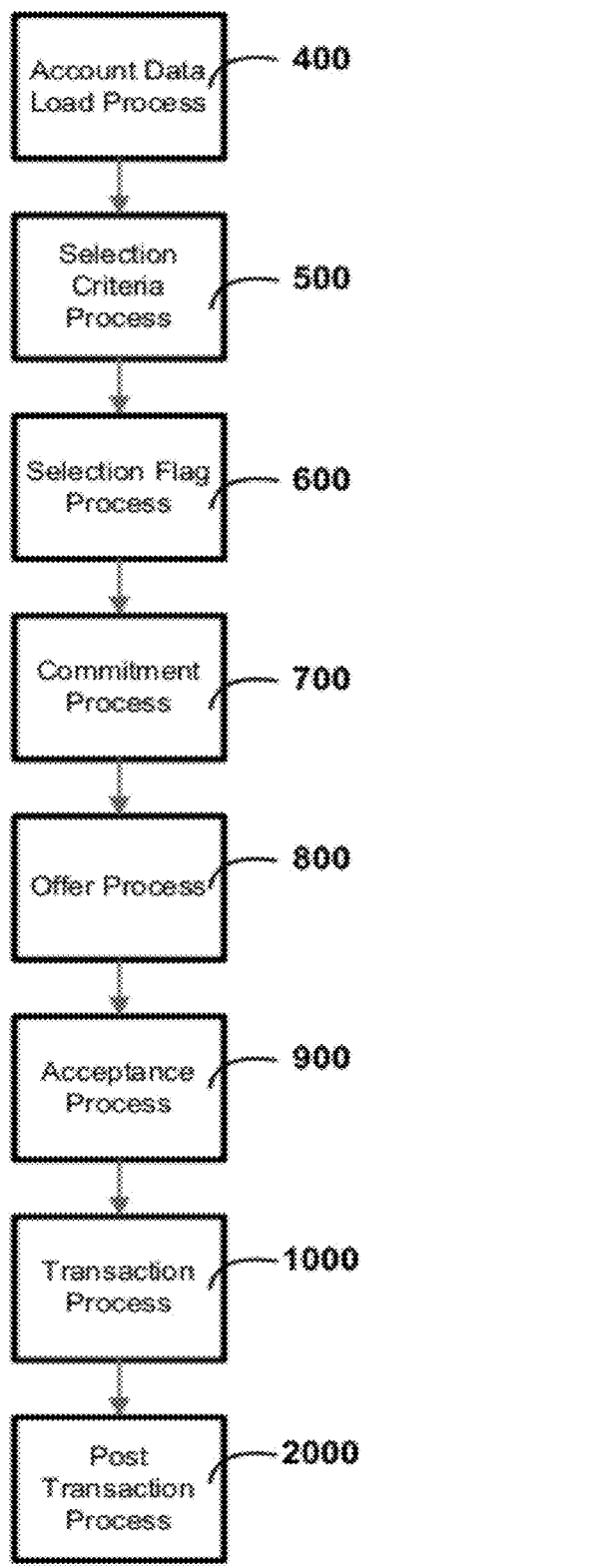

FIG. 3 depicts a context diagram for an Online Marketplace.

Figure 4:
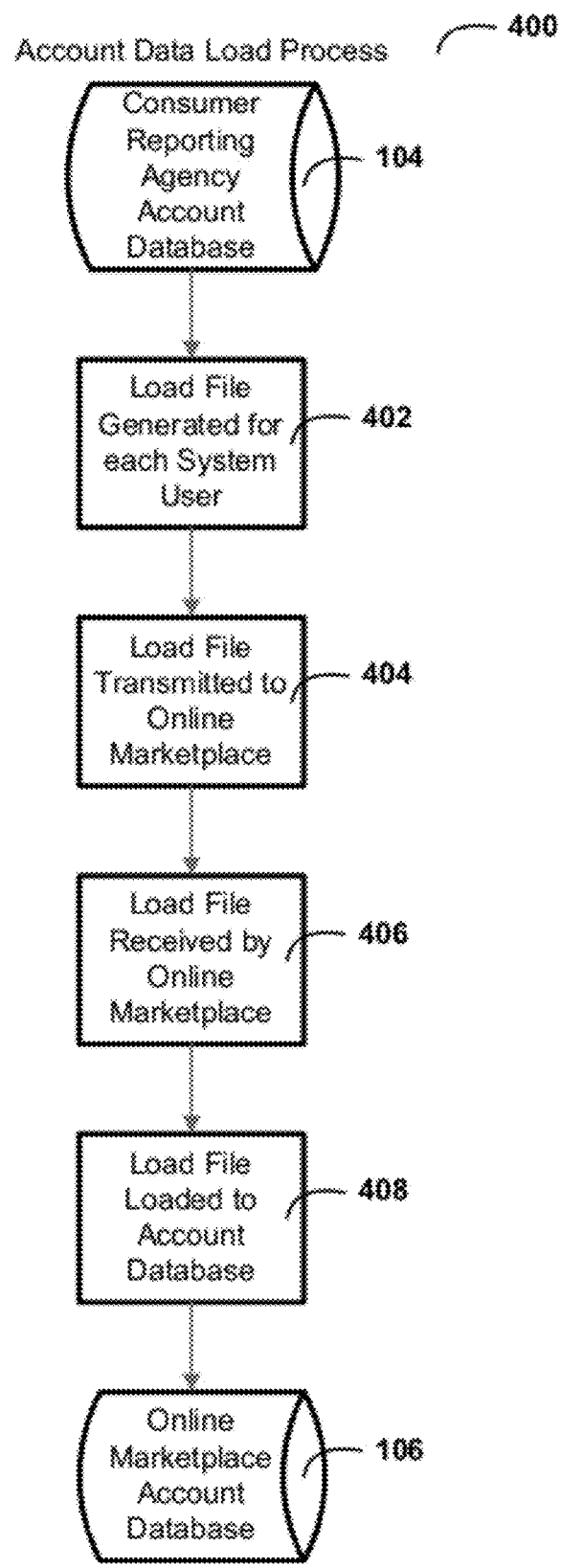

FIG. 4 depicts an Account Data Load Process workflow diagram for loading Account Data from a Consumer Reporting Agency Database to an Online Marketplace Account Database.

Figure 5:
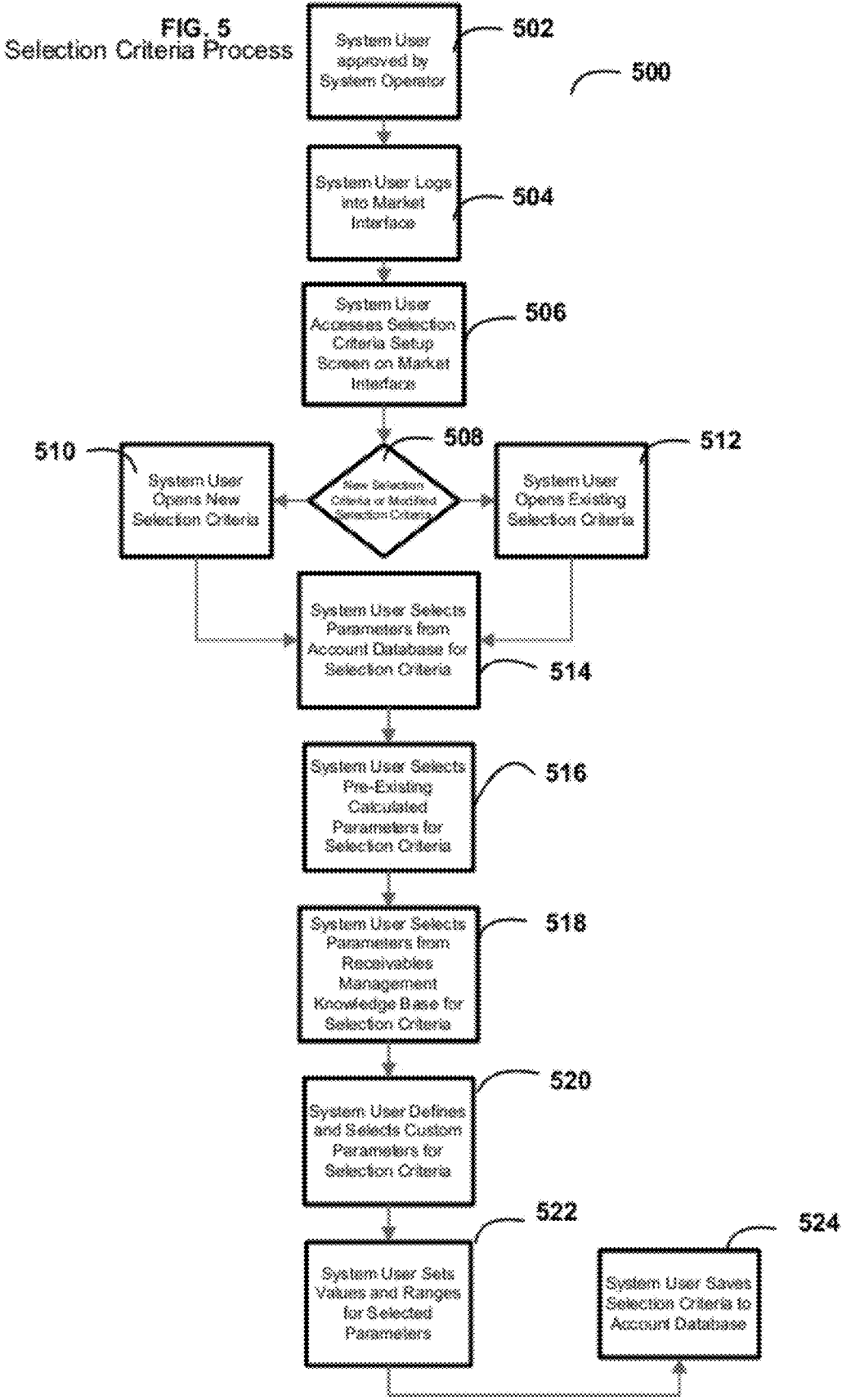

FIG. 5 depicts a Selection Criteria Process workflow diagram for a System User defining Selection Criteria on an Online Marketplace Account Database.

Figure 6:
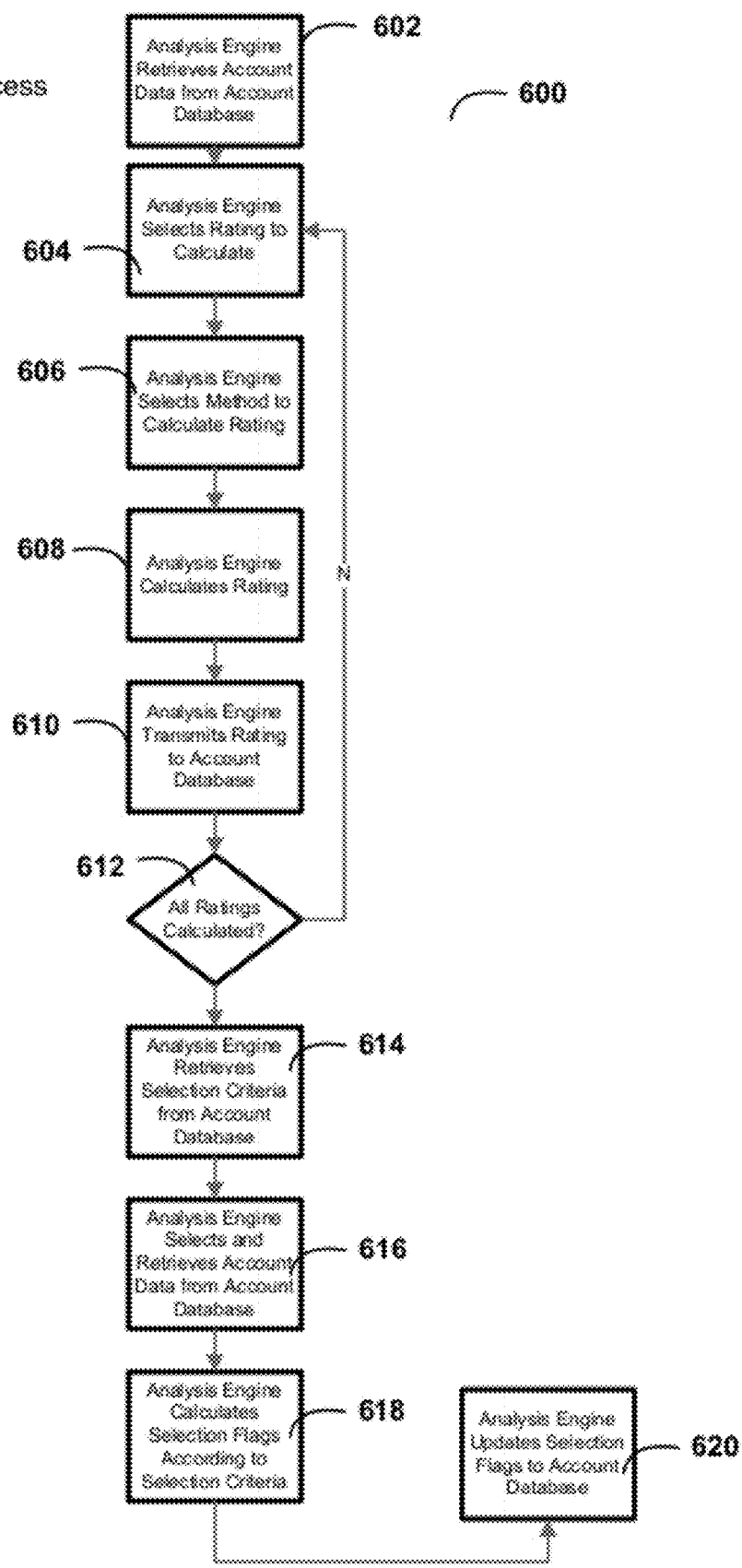

FIG. 6 depicts a Selection Flag Process workflow diagram for an Analysis Component creating Selection Flags, based on a System User's Selection Criteria.

Figure 7:
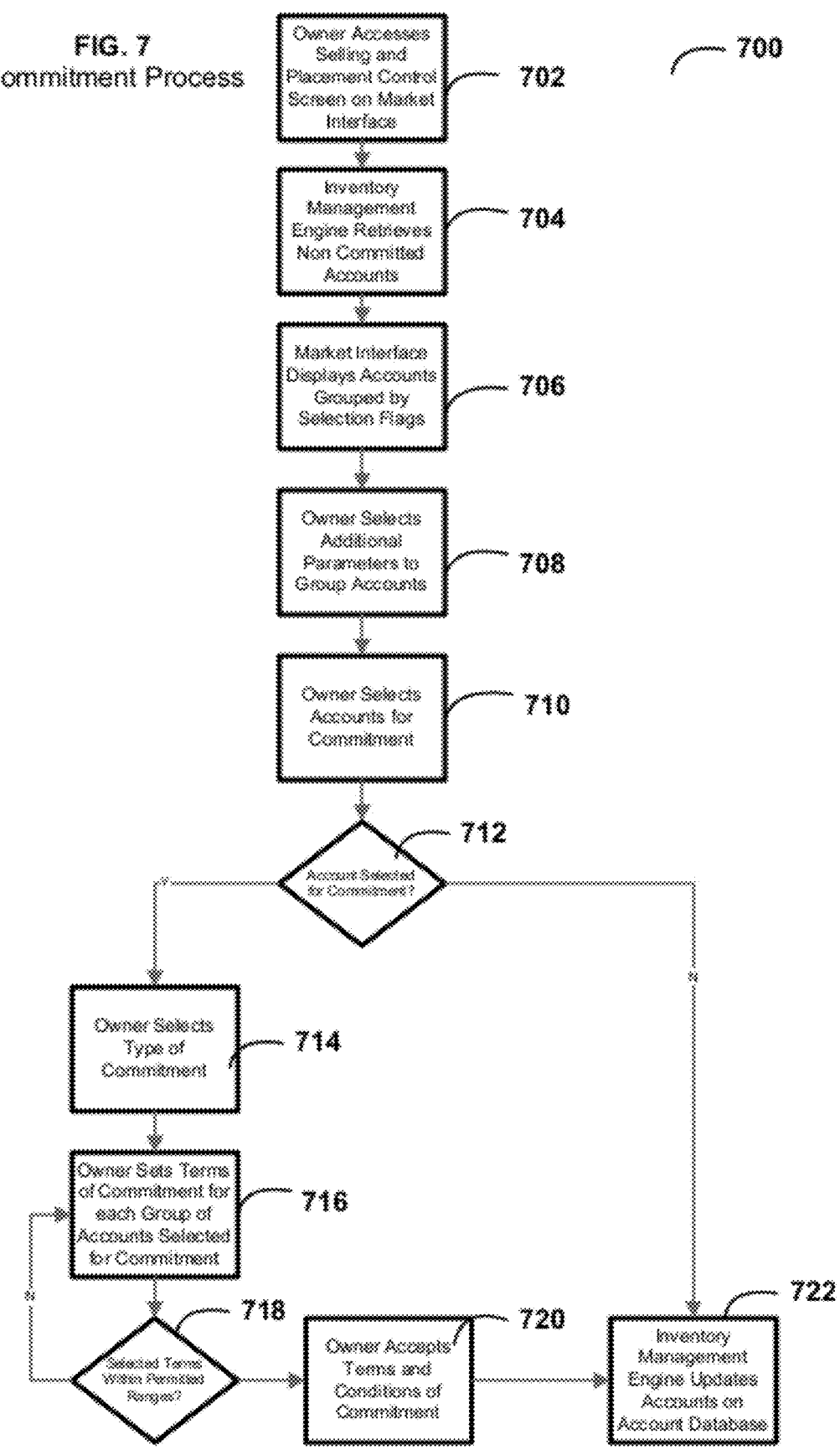

FIG. 7 depicts a Commitment Process workflow diagram for a System User's Commitment to select Transaction terms and conditions of an Online Marketplace.

Figure 8:
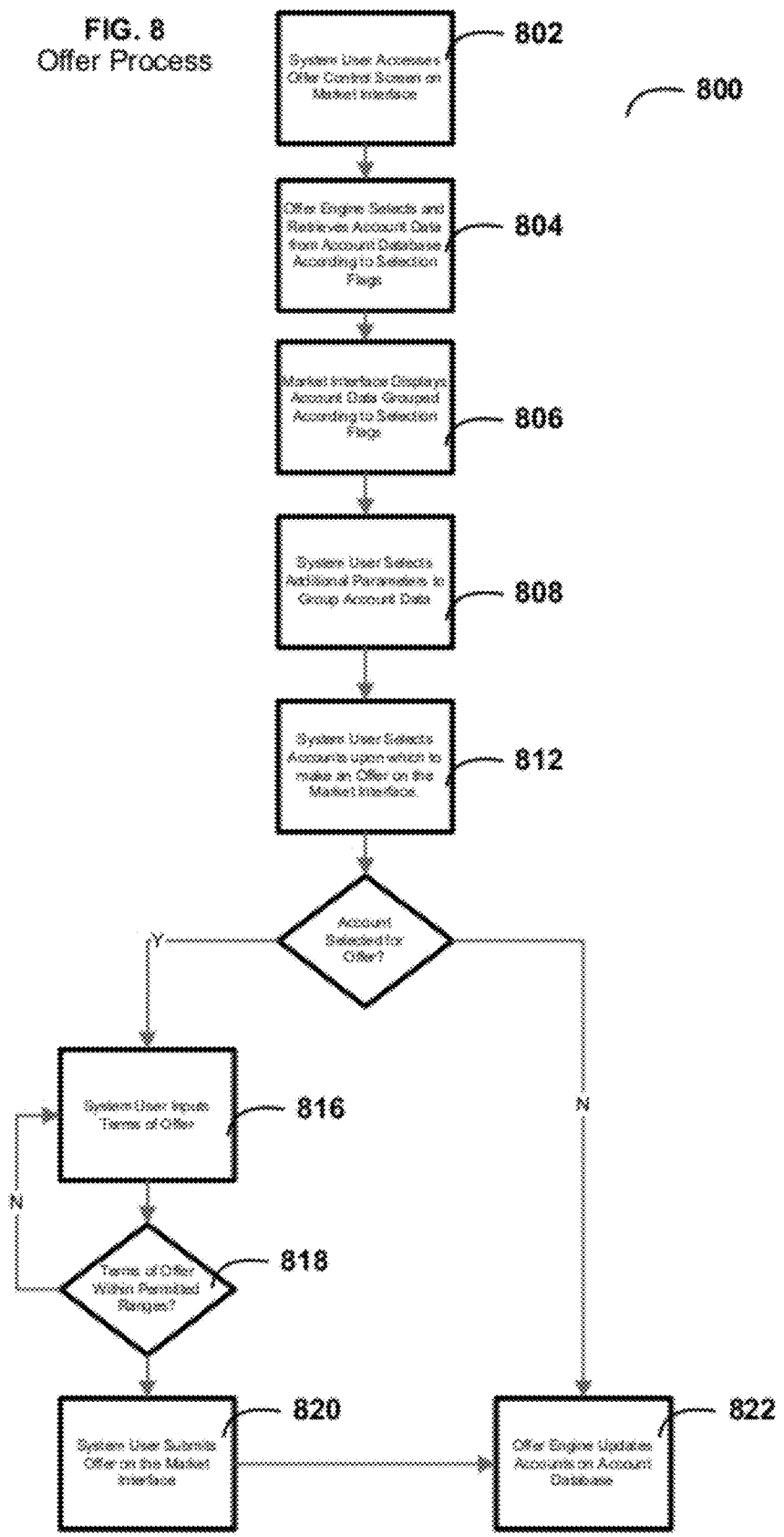

FIG. 8 depicts an Offer Process workflow diagram for a System User making an Offer within an Online Marketplace.

Figure 9:
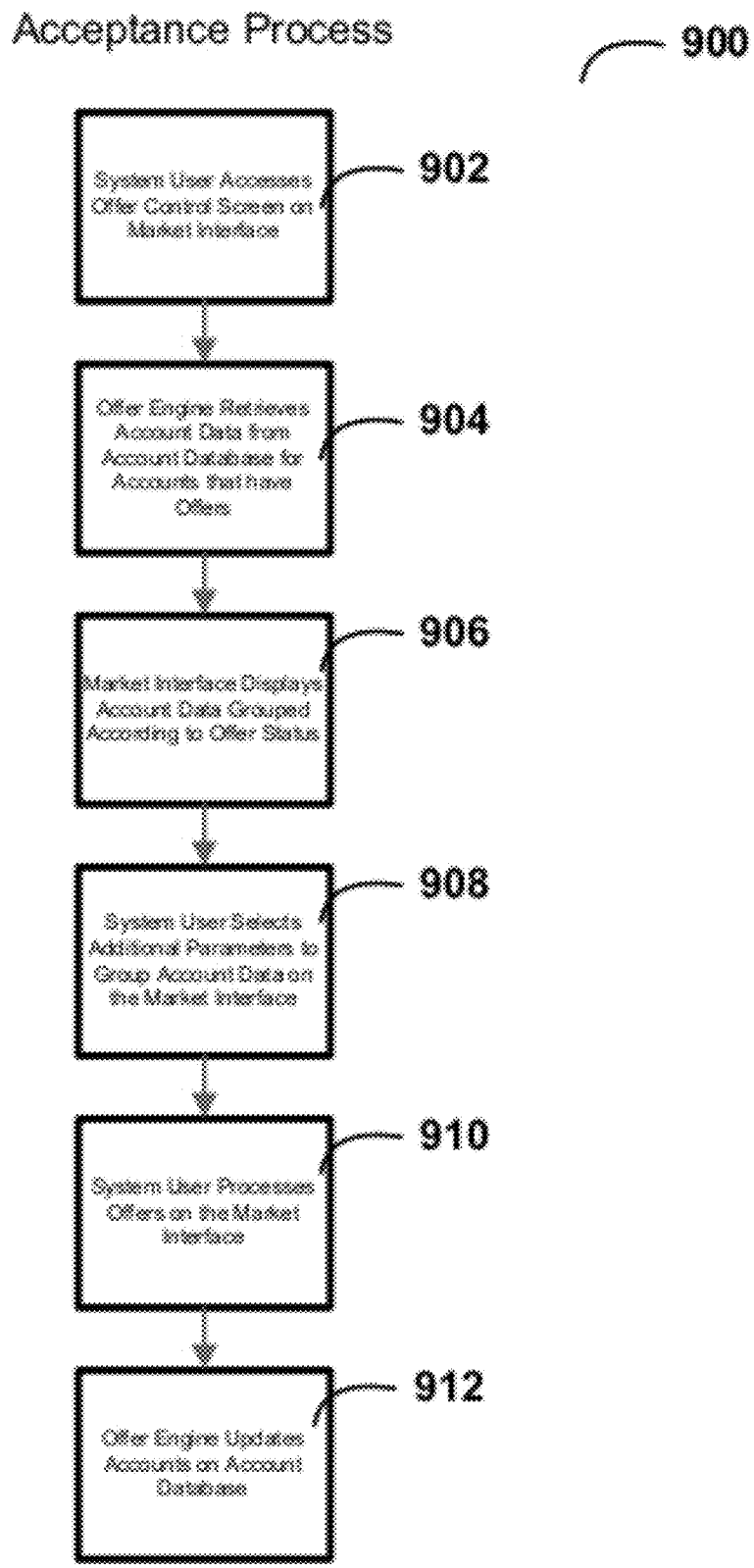

FIG. 9 depicts an Acceptance Process workflow diagram for a System User acting upon an Offer within an Online Marketplace.

Figure 10:
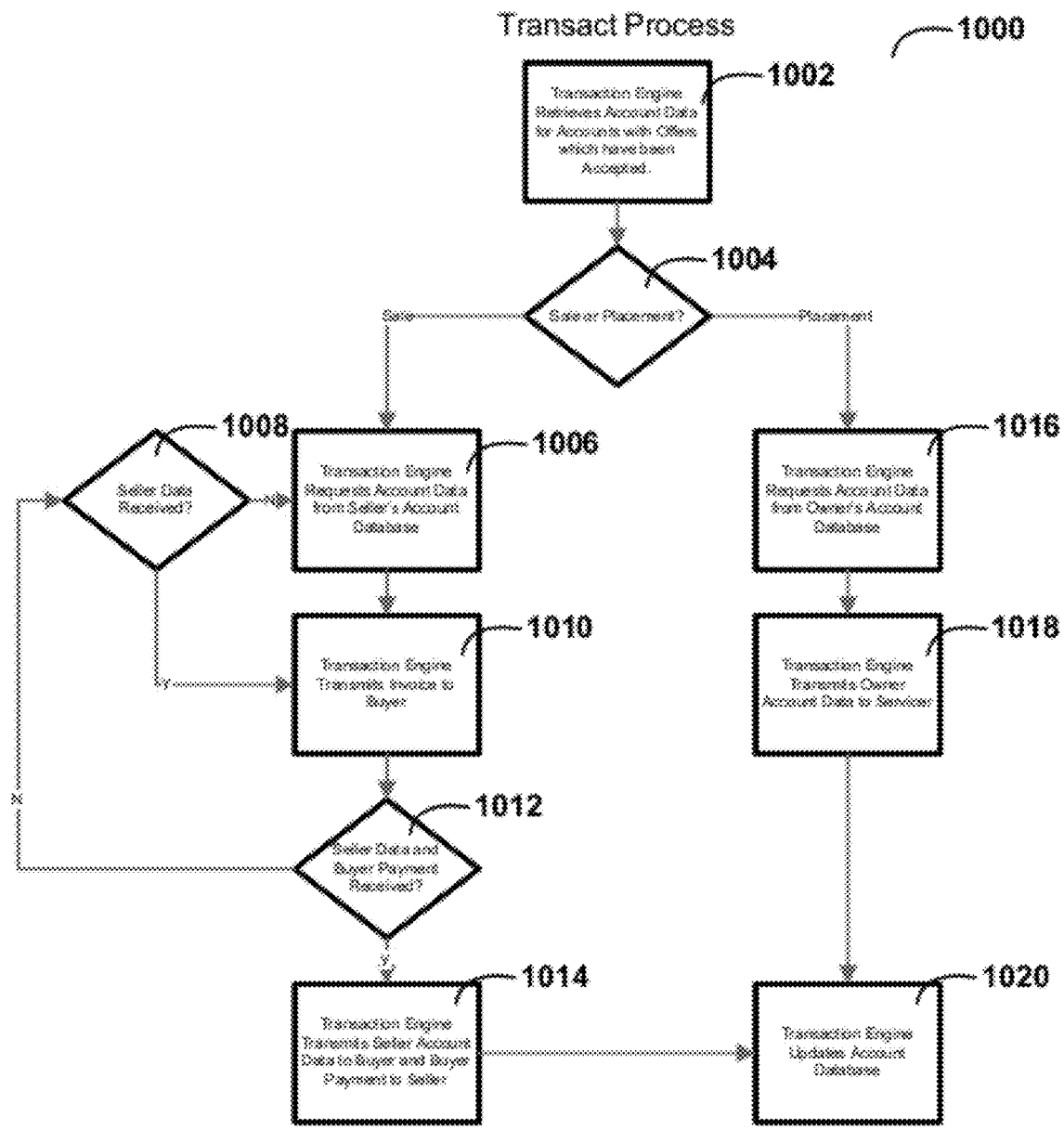

FIG. 10 depicts a Transact Process workflow diagram for an Online Marketplace.

Figure 11:
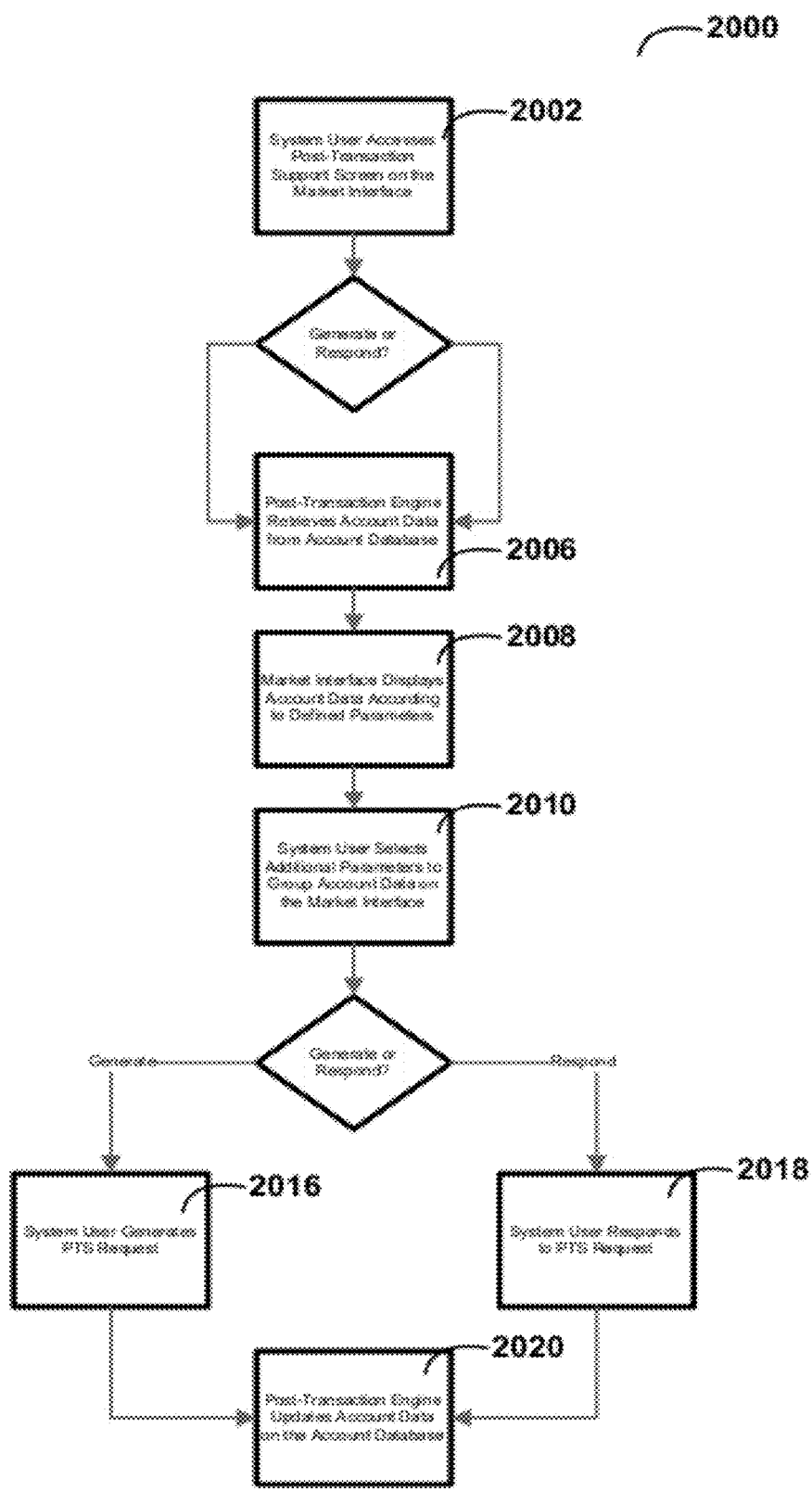

FIG. 11 depicts a Post-Transaction Process workflow diagram for an Online Marketplace.

DETAILED DESCRIPTION

As required, detailed embodiments of the present invention are disclosed herein. It will be understood that the disclosed embodiments are merely examples to illustrate aspects of the invention that may be embodied in various and alternative forms. The figures are not necessarily to scale or in a sequential order, and some features may be exaggerated or minimized to show details of particular Components. In other instances, well-known materials or methods have not been described in detail to avoid obscuring the present invention. Therefore, specific structural and functional details disclosed herein are not to be interpreted as limiting, but as a basis for the claims and for teaching one skilled in the art to variously employ the present invention.

As used in the description herein and attachments hereto, the meaning of "a," "an," and "the" includes plural reference unless the context clearly dictates otherwise. Also, as used in the description herein and attachments hereto, the meaning of "in" includes "in" and "on" unless the context clearly dictates otherwise. Finally, as used in the description herein and attachments hereto, the meanings of "and" and "or" include both the conjunctive and disjunctive and may be used interchangeably unless the context clearly dictates otherwise. Defined terms carry the stated definitions whether expressed as nouns, verbs, adjectives or any other grammatical variation, throughout the specification and claims.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Further, although process steps, method steps, systems or the like may be described in a sequential order, such processes, methods and systems may be configured to work in alternate orders. In other words, any sequence or order of steps that may be described does not necessarily indicate a requirement that the steps be performed in that order. The steps of processes described herein may be performed individually or in any order practical. Further, some steps may be performed simultaneously.

It will be readily apparent that the various methods and systems described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, sets of instructions that implement such methods and algorithms may be stored as programs and transmitted using a variety of known media.

The marketplace of certain embodiments of the present invention can be implemented in hardware, software or a combination thereof. In one exemplary embodiment, the marketplace is implemented in software or firmware that is stored in a memory or computer readable medium, and that is executed by a suitable instruction execution system. If implemented in hardware, as in an alternative embodiment, the marketplace can be implemented with any technology, which is known in the art.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor, and the like. Transmission media may include or convey acoustic waves, light waves and electromagnetic emissions, such as those generated during radio frequency (RF) and infrared (IR) data communications, or any other wireless form of communication. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Where databases are described, it will be understood by one of ordinary skill in the art that (i) alternative database structures to those described may be readily employed; (ii) other memory structures besides databases may be readily employed.

Devices that are in communication with each other need not be in continuous communication with each other, unless expressly specified otherwise. In addition, devices that are in communication with each other may communicate directly or indirectly through one or more intermediaries. Additionally, a description of an embodiment with several Components in communication with each other does not imply that all such Components are required. On the contrary a variety of optional Components are described to illustrate the wide variety of possible embodiments of the present invention.

ADDITIONAL DEFINITIONS

Data Definitions:

Acceptance—One party's agreement to the Offer of another party.

Account—A debt obligation due and owing from one person or entity to another person or entity for goods received or services rendered.

Account Data—Any data concerning an Account, including but not limited: (i) the Owner of the Account; (ii) the Servicer of the Account; (iii) the debtor of the Account; (iv) the payment history of the Account; (v) the balance of the Account; (vi) the interest rate of the Account; and (vii) similar elements.

Account Database—Any collection of Account Data, current or historical, which is generally updated on a periodic basis, including but not limited to: (i) a collection of Account Data maintained by an Owner, Seller, Buyer or Servicer of Accounts regarding its own Accounts; (ii) a collection of Account Data supplied by multiple Owners and Servicers of Accounts and maintained by a third party such as a Reporting Agency or Consumer Reporting Agency; (iii) a collection of Account Data maintained by a third party which is not directly linked to personally identifiable information and typically used for a variety of analysis; (iv) similar collections of Account data; and (iv) any combination of such collections of Account Data and the like.

Commitment—A System User's agreement to certain defined terms, including, but not limited to: (i) in the case of selling Accounts, a minimum time an Account is available for purchase on the Online Marketplace, a maximum price upon which a Seller can base a refusal to accept an Offer, and a maximum price, upon which a Seller will automatically accept an Offer; and (ii) in the case of Servicing Accounts, a minimum time an Account is available for Servicing Offers on the Online Marketplace, a minimum Servicing fee upon which an Owner can base a refusal to accept an Offer to Service, and a minimum Servicing fee upon which Owner will automatically accept a Servicing Offer.

Consumer Reporting Agency—Any entity that aggregates personally identifiable Account Data in an Account Database and provides such information to third parties which have a permissible purpose to access such Account Data.

Offer—A proposed payment amount or fee from a potential Buyer or Servicer and any other terms of a Transaction, respectively.

Parameter—Data element relative to determining whether Account(s) should be sold, purchased or serviced and which can be measured using Ratings, including but not limited to: (i) Parameters defined relative to the Account, such as balance range, payment history, age and demographic information related to the debtor of the Account; (ii) Parameters defined relative to the market of the Accounts, such as fair market value, the liquidity of similar Accounts, and market trends; and (iii) Parameters defined relative to the system of laws, rules and regulations governing the Servicing of Accounts, such as statutes of limitation, licensing laws, and the availability of certain Servicing methods such as wage garnishment in particular jurisdictions.

Post-Transaction Data—Data relative to the Servicing of Accounts which may be exchanged between the parties to a Transaction after the closing of the Transaction, including but not limited to data relative to media requests, put-backs, trailing payments, contract consent issues, chain of title and the like.

Potential Consolidation—A selection of multiple Accounts with logically similar data elements which imply that the Accounts should be Serviced or purchased together to maximize the efficacy of Servicing, including but not limited to the same debtor for the Accounts in the selection, closely related debtors for the Accounts in the selection, other similar demographic characteristics for the Accounts in the selection and other logically similar data elements.

Ratings—Objective numeric ranking assigned to a Parameter using a pre-determined method within a defined range.

Reporting Agency Database—Any collection of consumer or commercial Account Data, current or historical, that is generally updated on a periodic basis.

Selection Criteria—A plurality of deterministic values and ranges for a set of selected Parameters and Ratings, defined by a System User, which may be applied to a set of Accounts, as computing instructions, to test each Account for a stated condition or set of conditions. Selection Criteria may include: Parameters and Ratings available on the Account Database; aggregate, calculated Parameters and Ratings derived from market activity; and a set of Parameters and Ratings available in a Receivables Management Knowledge Base.

Servicing—The collection and management of Accounts.

Selection Flags—A particular Parameter of an Account which is defined relative to a particular System User to indicate a range of possible actions relative to the Account and the particular System User, including but not limited to, the actions of selecting the Account for potential Commitment to the Online Marketplace with manual review by the System User, selecting the Account for a potential Transaction with manual review by the System User, selecting the Account for automatic Commitment to the Online Marketplace and selecting the Account for an automatic Offer to the Owner for purchasing or Servicing.

Transaction—The sale of at least one Account from a Seller to a Buyer or the placement for Servicing of at least one Account from an Owner to a Servicer.

Transaction Data—Data related to a Transaction, including but not limited to terms of sale, condition of payments, payments from Buyers to Sellers, Account Data and the like.

System Definitions:

Analysis Component—Computing process consisting of a Component that receives inputs of Account Data from the Account Database and Receivables Management Knowledge Base, associates Ratings to Parameters, associates Selection Flags to Accounts according to Selection Criteria, and produces outputs of Ratings and Selection Flags for Accounts to the Account Database.

Components—The individual computing processes that make up the Online Marketplace.

Inventory Management Component—Computing process consisting of a Component that receives System User inputs from the Market Interface, Selection Flags from the Analysis Component, and Acceptances from the Offer Component to produce outputs to the Account Database which define the current status, ownership and Servicers (if applicable) of each Account.

Market Interface—A globally available computing process in the form of a user interface which: (i) outputs information to System Users, including but not limited to Offers, Acceptances, output of Selection Criteria and responses to queries, through the use of onscreen displays and reports; (ii) and receives inputs from System Users for a variety of processes, including but not limited to selection processes, creation of Selection Criteria, Offers and Acceptances.

Offer Component—Computing process consisting of a Component which receives inputs from the Market Interface and Account Database to process automated and manual Offers, Seller Commitments and Acceptances from System Users and produces outputs to the Account Database which define the terms of a Transaction.

Online Marketplace—The medium through which Owners, Buyers, Sellers, and Servicers conduct Transactions using the Components over a communications network, including but not limited to the Internet or a similar private communications network.

Post Transaction Support Component—Computing process consisting of a Component that receives inputs from the Market Interface and Account Database relative to Post-Transaction Data, facilitates the resolution of issues defined by the Post-Transaction Data, and produces outputs to the Account Database to update the status of the Post-Transaction Data.

Receivables Management Knowledge Base—A collection of facts and rules for problem solving in the receivables management industry, in particular laws, rules and regulations governing the Servicing of Accounts, such as statutes of limitation, licensing laws, and the availability of certain Servicing methods such as wage garnishment in particular jurisdictions.

Servicing Component—A computing process that manages Accounts and collection processes.

Transaction Component—Computing process consisting of a Component that receives inputs from the Account Database for Accounts that are selected for a Transaction, facilitates the closing of a Transaction by handling closing processes, including but not limited to the transfer of Account Data between System Users and settlement between System Users, and produces outputs to the Account Database that update the current status, ownership and Servicers (if applicable) of each Account of the Transaction.

System User Definitions:

Buyer—Entity that utilizes the Market Interface to purchase Accounts through Transactions.

Owner—Entity that utilizes the Market Interface to sell or acquire Servicing for Accounts through Transactions.

Seller—Entity that utilizes the Market Interface to sell Accounts through Transactions.

Servicer—Entity that utilizes the Market Interface to accept Accounts for Servicing.

System Operator—Entity that maintains and administers the Online Marketplace.

Description of an Exemplary Embodiment of an Online Marketplace for Debt Consolidation and Account Purchase and Sale with an Account Database Connected to a Consumer Reporting Agency Account Database Referring now to the drawings in which like numerals indicate like elements throughout the several views, the drawings illustrate certain of the various aspects of exemplary embodiments of an Online Marketplace according to the teachings of the present invention. Please note the enumerated listing of items herein does not imply that any or all of the items are mutually exclusive, unless expressly specified otherwise.

FIG. 1 depicts the basic Components and overall structure and context 100 of the Online Marketplace 100 of this exemplary embodiment, connected to a Consumer Reporting Agency Account Database 104 and being accessed via a communications network 114 by a System User 102. The System User 102 may be any Account Owner, Seller, Buyer, Servicer or the like, some of whom may periodically transmit and update Account Data in a Consumer Reporting Agency Account Database 104. The Account Database 106 of the Online Marketplace loads Account Data from the Consumer Reporting Agency Account Database 104, as will be discussed in detail with reference to FIG. 4.

A System User 102 accesses the Online Marketplace's Market Interface 112 via any communications Network 114, such as the Internet, a private ATM network or the like, which is connected to the Online Marketplace 100. The Market Interface 112 allows a System User 102 to view Account Data from the Account Database 106, interact with the Business Logic Layer 200 of the Online Marketplace 100 and interact with other System Users 102 through the Business Logic Layer 200. The Market Interface 112 may be hosted by any program able to receive and display outputs from the Business Logic Layer 200 of the Online Marketplace 100, an example being general purpose programs such as Internet web browser programs, which are connected to user input devices such as a keyboard and a mouse, through a general purpose computing device. General purpose programs such as Internet web browser programs may provide a graphical user interface (GUI) which may be utilized on the Market Interface 112. The GUI may be any screen display of text and images arranged in a logical order that allows a System User 102 to easily enter data and select displayed options. In alternative embodiments, a System User 102 may connect to an existing interface of the Consumer Reporting Agency 104 to reach the Online Marketplace 100 of the present invention, or connect directly to other System Users 102 in a peer-to-peer configuration of an alternative Online Marketplace of the present invention.

Referring still to FIG. 1, The Business Logic Layer 200 of the Online Marketplace 100 analyzes and updates the Account Data in the Account Database 106. The Business Logic Layer 200 will be discussed in detail with reference to FIG. 2.

FIG. 1 further illustrates the Business Logic Layer 200 receiving data from a Receivables Management Knowledge Base 108. The Receivables Management Knowledge Base 108 contains facts and rules for problem solving in the receivables management industry, such as statutes of limitations, the costs associated with prosecuting a lawsuit in a particular jurisdiction and other such regulatory and factual data. Additionally, the Business Logic Layer 200 may be connected to an external Servicing Component 110, as shown in this exemplary embodiment, to allow a System User 102 to transmit Account Data to a Buyer or Servicer for Servicing, utilizing features of the Business Logic Layer 200.

Referring still to FIG. 1, the CRA Account Database is shown outside the scope of the system of this exemplary embodiment of the present invention. In alternative embodiments, the CRA Account Database may be part of the system of the exchange or may hold all Account Data and all related Transaction Data.

FIG. 2 depicts the Components that collectively form the Business Logic Layer 200. In general, the Business Logic Layer 200 may be any processor, collection of processors, any variant of a known processing unit on a general purpose computing device or any program operating on such a device. The Components of the Business Logic Layer 200 may be built and utilized by one of ordinary skill in the art, based on the following descriptions.

In this exemplary embodiment, the Business Logic Layer 200 comprises an Analysis Component 202, an Offer Component 204, an Inventory Management Component 206, a Transaction Component 208 and a Post-Transaction Component 210. Each of these Components interacts with both the Account Database 106 and the Market Interface 112 of the Online Marketplace, and may interact with the Receivables Management Knowledge Base. These Components may operate on at least one general computing device, a series of general computing devices or a combination or any other arrangement of general purpose computing devices.

FIG. 3 depicts a Process Context Diagram 300 for the Online Marketplace, illustrating a possible flow pattern between select processes of an Online Marketplace. The following processes may be performed by the Online Marketplace of this exemplary embodiment in this order: Account Data Load Process 400, Selection Criteria Process 500, Selection Flag Process 600, Commitment Process 700, Offer Process 800, Accept Process 900, Transaction Process 1000 and Post-Transaction Process 2000. These processes are discussed in detail with respect to FIGS. 4 through 11. These processes are depicted in one possible event order. It is to be understood that these processes and other processes may be performed in any order, any combination of orders, or individually.

FIG. 4 depicts a workflow diagram 400 for loading Account Data from a Consumer Reporting Agency Account Database 104 to the Account Database 106 of the Online Marketplace. The Consumer Reporting Agency Database 104 is a separate Account Database that aggregates personally identifiable Account Data and provides such information to third parties. Examples of well known Consumer Reporting Agencies include Equifax®, Experian® and Trans Union®. In alternative embodiments the Account Data of a commercial Reporting Agency, such as Dun & Bradstreet Inc., may be utilized.

The Consumer Reporting Agency Account Database 104 and any and all associated Components generate 402 a load file for each System User that has selected Accounts to be sent from the Consumer Reporting Agency Database to the exchange of the present invention. The load file is transmitted 404 to the Online Marketplace. Once the Online Marketplace receives 406 the load file, it will validate, transform and import 408 the load file to the Account Database 106. Such load files may be in any format of a computer-readable medium, as discussed above. In this exemplary embodiment, such load files are transmitted from one computer readable medium on the Consumer Reporting Agency Account Database, such as a magnetic hard disk, to a computer readable medium storing the Account Database of the Online Marketplace as packetized data, using TCP/IP packets and a protocol such as the File Transfer Protocol. The databases of the present invention may process inputs and arrange data with any applicable database protocol and in any computing language known in the art, such as SQL and the like.

Additionally, in the exemplary embodiment, the load file generated 402 may be based upon Account Data flagged by a System User as those Accounts to be available for Commitment to the Online Marketplace. For example, a System User may transmit Account Data to a Consumer Reporting Agency Account Database on a periodic basis, using a standard "Metro II" Electronic Data Interchange (EDI) transmission and flag certain Accounts. In alternative embodiments, the Online Marketplace of the present invention may retrieve and/or load the entire universe of data available from the Consumer Reporting Agency Account Database for a particular System User, or pre-existing groupings, or combinations of groupings, of Account Data.

Additionally, as mentioned above, in alternative embodiments the CRA database may also act as the Account Database and store all Account and Transaction Data. Alternatively, a CRA user may choose from Selection Criteria provided by a user interface of the CRA to choose which Accounts may enter the exchange of the present invention.

FIG. 5 depicts a Selection Criteria Process workflow diagram 500 for a System User defining Selection Criteria on the Account Database of the Online Marketplace. Defining Selection Criteria allows the System User to enact certain business rules for the management of its Account Data and Transactions. For example, a System User may set Selection Criteria to generate a Selection Flag for any of its Accounts that are within one year of the applicable statute of limitations, as provided by the Receivables Management Knowledge Base. A System User may then Commit such Accounts to be offered for sale in an Offer Process discussed in more detail with reference to FIG. 8. In alternative embodiments, a System User may be permitted to complete System User profiling questions that may further facilitate the recommendation of Accounts for purchase, sale or Servicing by the Online Marketplace of the present invention or such profiles may be automatically generated base on System User behavior.

In this exemplary embodiment, a System User is approved 502 by a System Operator to control access 504 to the Online Marketplace. A System User may then access 506 the Selection Criteria Setup screen on the Market Interface. The System User selects 508 whether to input new Selection Criteria or to modify existing Selection Criteria. If inputting new Selection Criteria, the System User opens 510 a new Selection Criteria screen. If modifying Selection Criteria, the System User opens 512 the Existing Selection Criteria screen. For both of these selections, the System User selects Parameters to specify. In this exemplary embodiment, the System User may select from four types of Parameters: Account Data Parameters 514, pre-existing, calculated Parameters 516, Parameters 518 from the Receivables Management Knowledge Base, and custom Parameters 520 defined by the System User. Pre-existing, calculated Parameters 516 may be the current fair market value of Accounts similar to those selected by the System User based on recent Transactions on the Online Marketplace, similar calculations based on other Parameters and the like. Custom Parameters 520 may be defined to select, for example, those Accounts that have a balance range of x to y and that are within z months of the applicable statute of limitations and the like.

The System User selects 522 values and ranges for each selected Parameter and saves 424 these settings to the Account Database. The values and ranges will define the formula for each business rule of the Selection Criteria. For example, a System User may desire to select Accounts that have a current balance of less than one thousand dollars.

Allowing a System User to select and define Parameters and Selection Criteria may facilitate efficient market activity by allowing the System User to make Transaction decisions on sets of Accounts that share similar characteristics. Additionally, Potential Consolidation options may be displayed to System Users, such as Transacting for Accounts with matching Parameters, such as debtor, zip code and the like.

In alternative embodiments, the Analysis Component may receive or retrieve Account Data directly from a System User's Account Database when processing the Selection Criteria. Such an embodiment may allow, for example, a System User to check for Accounts with matching Parameters on its own Account Database, which is not directly connected to the Online Marketplace.

Selection Criteria have different purposes depending on the role of the System User, in particular: in the case of Selection Criteria for selling or placement, to select Accounts from the set of Accounts related to a particular Owner that are recommended for Commitment to the Online Marketplace, and in the case of Selection Criteria for buying or Servicing, to select Accounts from the set of Accounts Committed to the Online Marketplace that are recommended for a Transaction.

FIG. 6 depicts a Selection Flag Process 600 workflow diagram for an Analysis Component creating Selection Flags, based on System Users' Selection Criteria, on the Online Marketplace Account Database. In this exemplary embodiment, Selection Flags are utilized to demarcate Accounts for certain further processes. For example, the Analysis Component retrieves 602 Account Data from the Online Marketplace Account Database. Retrieval 602 may occur on a scheduled, periodic, continuous or triggered basis. The Analysis Component selects 604 a Rating to calculate for a Parameter, and selects 606 the associated method to calculate Rating. The Analysis Component calculates 608 the Rating and transmits 610 the Rating to the Account Database. The Analysis Component may repeat 612 the calculation steps 604 through 610 for all necessary Ratings.

The Analysis Component retrieves 614 unprocessed Selection Criteria and retrieves 616 associated Account Data from the Account Database. The Analysis Component calculates 618 Selection Flags according to the Selection Criteria and updates 620 the Account Database.

FIG. 7 depicts a Commitment Process 700 workflow diagram for a System User's Commitment to select terms and conditions of the Online Marketplace for selected Accounts. In this exemplary embodiment, to prevent manipulation of the Online Marketplace by a System User, a System User must agree to the terms and conditions of the Online Marketplace in order to place Accounts for sale or for Servicing. For example, a System User may agree to a set period of time for the Account(s) to be Committed to the Online Marketplace, a fixed price for an automatic Acceptance and a maximum price upon which an Offer may be refused.

Referring still to FIG. 7, the System User, who for this process must be an Account Owner, accesses 702 the Selling and Placement Control screen on the Market Interface of the Online Marketplace. The Inventory Management Component retrieves 704 non-committed Accounts from the Account Database. In alternative embodiments, the functions of an Inventory Management Component may be performed by any similar Component of the Market Interface or the Market Interface may access the Account Database of the Online Marketplace directly without the benefit of such a Component. The Market Interface displays 706 Accounts, grouped by Selection Flags for the Owner. The Owner may select 708 additional Parameters to group Accounts in the Market Interface display, for ease of use. The Owner selects 710 Accounts for Commitment to the Online Marketplace and selects 714 the type of Commitment. For example, the Owner may Commit the Account to be placed "for sale" on the Online Marketplace, allowing potential Buyers to make Offers; or the Owner may place the Account on the Online Marketplace to be serviced, allowing potential Servicers to make Offers. The Owner sets 716 the terms and conditions for each group of selected Accounts and the Online Marketplace determines 718 whether or not the terms and conditions are within permitted ranges. The Owner accepts 720 the terms and conditions of Commitment. The Market Interface may display the Commitment with legally binding language creating a contract subject to any and all appropriate laws. The Inventory Management Component updates 722 Accounts on the Account Database of the Online Marketplace with all Commitment selections. Flagged Accounts that are not selected 710 for Commitment 712 are also updated 722 in the Account Database by the Inventory Management Component. Additionally, the Online Marketplace may perform a validation of the terms of Commitment against permissible stored ranges and values.

In alternative embodiments, the Online Marketplace could require Commitment from a System User when Accounts are submitted to the Consumer Reporting Agency Account Database, when Accounts first enter the Online Marketplace Account Database or some other stage of the Online Marketplace before the Account Data has entered the Online Marketplace Account Database.

FIG. 8 depicts an Offer Process 800 workflow diagram for a System User making an Offer within the Online Marketplace. A System User may access 802 the Offer Control Screen on the Market Interface. The Offer Component selects and retrieves 804 Account Data from the Account Database according to Selection Flags, such as those generated in the Selection Flag Process of FIG. 6. For example, the Offer Component may retrieve Account Data demarcated by a Selection Flag showing that the Account has been Committed to the Online Marketplace as "for sale" and a Selection Flag showing that the Account has been selected by the System User's own Selection Criteria for a potential Transaction. In alternative embodiments, the Online Marketplace of the present invention may suggest Transactions, such as Offers, Acceptances and the like, to a System User. Such suggestions may be based on the System User's Transaction history, profiling of System Users, other market activities or any other relevant factors. The Offer Process 800 may be implemented with any auction software package as known in the art or any series of programmed steps stored in a computer-readable storage medium to be processed by a general purpose computing device.

Referring still to FIG. 8, the Market Interface displays 806 the Account Data grouped according to Selection Flags, for ease of use by the System User. For greater convenience, the System User may select 808 additional Parameters to group Account Data on the Market Interface. The System User may select 812 Accounts upon which to make an Offer from these groupings on the Market Interface. A System User inputs 816 terms for each Offer. If the terms of the Offer are permitted 818 by the Online Marketplace, the System User may submit 820 the Offer. The Offer Component updates 822 the Account Database with all Offer data. An example of an Offer not being permitted 818 is if an alternative Offer for a particular Account submitted by another System User already exists on the Account Database, the proposed Offer may be rejected by the Online Marketplace if the alternative Offer is for a higher price.

FIG. 9 depicts an Acceptance Process 900 workflow diagram for a System User acting upon an Offer within the Online Marketplace. The System User accesses 902 the Offer Control screen on the Market Interface. The Offer Component retrieves 904 Account Data from the Account Database for the Accounts that have Offers, relative to that System User. The Market Interface displays 906 Account data grouped according to Offer status. The System User may select 908 additional Parameters to further group the Account Data, for ease of use.

The System User processes 910 the Offers on the Market Interface. For example, the System User may accept, decline or acknowledge an Offer. The System User may accept an Offer if the Offer price is acceptable, and a System User simply acknowledges an Offer that was automatically accepted due to the automatic term for the corresponding Commitment for the Account having been met. If, for example, a System User had Committed an Account with an automatic Acceptance price and a potential Buyer offered that amount, the Offer would be automatically accepted and submitted to the System User/Seller for acknowledgement. The Offer Component updates 912 Account Data on the Account Database with all Offer data. Accepted and acknowledged Offers trigger the Transaction Process of FIG. 10.

FIG. 10 depicts a Transaction Process 1000 workflow diagram for the Online Marketplace. The Transaction Component retrieves 1002 Account Data for Accounts with Offers which have been accepted. In this exemplary embodiment, the Market Interface will present two separate workflows of the Online Marketplace, based upon whether the Account was offered "for sale" or "for placement."

If the accepted Offer was for the sale of an Account, the Transaction Component requests 1006 Account Data from the Seller's Account Database and transmits 1010 an invoice to the Buyer. If the Seller's Account Data is received 1008 and the Buyer's payment is received 1012, the Transaction Component transmits 1014 the Seller's Account Data to the Buyer and the Buyer's payment to the Seller, and updates 1020 the Account Database. Therefore, in this exemplary embodiment, the Online Marketplace is acting as an escrow agent to hold Account Data and payments to ensure fair and equitable Transactions.

Referring still to FIG. 10, if the accepted Offer was for the placement of an Account for Servicing, the Transaction Component requests 1016 Account Data from the Owner, such as from the Owner's Account Database, and transmits 1018 the Owner's Account Data to the Servicer. The Transaction Component updates 1020 the Account Database, such as with new ownership data.

In an alternative embodiment, a Component, such as the Transaction Component, Inventory Management Component or the like, may update the Consumer Reporting Agency Account Database with new information, such as new Account Owner and the like. Such an update may be transmitted via any communications network and may be continuous, scheduled, periodic, batched or the like.

FIG. 11 depicts a Post-Transaction Process 2000 workflow diagram for the Online Marketplace. Purchasers and Servicers of Accounts often require Account information in addition to the basic Account Data provided upon purchase or placement. For example, the Buyer of an Account may need from the Seller certain documents that are related to the Account. The Buyer may request such documents in the Post-Transaction process.

To request or provide such information or documentation, the System User accesses 2002 the Post-Transaction screen on the Market Interface. The Post-Transaction Component retrieves 2006 Account Data from the Account Database, which is displayed 2008 on the Market Interface according to defined Parameters. The System User may select 2010 additional Parameters to group Account Data on the Market Interface, for ease of use. The System User generates 2016 requests and responds 2018 to requests on the Market Interface and the Post-Transaction Component updates 2020 the Account Database. For example, if the System User is responding to a request for media, the System User may scan and upload the requested documents for transmission to the requestor.

The present invention has been illustrated in relation to embodiments which are intended in all respects to be illustrative rather than restrictive. Those skilled in the art will recognize that the present invention is capable of many modifications and variations without departing from the scope of the invention.

Those skilled in the art will also appreciate that the Online Marketplace described represents only one example of the various marketplace types and configurations that will be suitable for implementation of the various embodiments of the invention. Accordingly, the scope of the present invention is described by the claims appended hereto and supported by the foregoing.

What is claimed is:
1. A system, comprising:
an account database comprising account data associated with one or more accounts, each of the one or more accounts representing an account receivable; and
a processor functionally coupled to the account database, wherein said processor is configured
to receive selection criteria,
to search said account database for one or more accounts having account data that satisfies at least a portion of said selection criteria,
provide a summary of any of said one or more accounts having account data that satisfies at least a portion of said selection criteria, wherein said summary includes a balance of the account but does not personally identify said one or more accounts having account data that satisfies at least a portion of said selection criteria
to receive an offer from a buyer for at least one of the said one or more accounts having account data that satisfies at least a portion of said selection criteria; and to accept automatically the offer in response to the offer fulfilling a term of a commitment for the at least one of the said one or more accounts having account data that satisfies at least a portion of said selection criteria, the term of the commitment comprising a fixed price upon which a seller automatically accepts the offer.

2. The system of claim 1, wherein the processor is further configured to reject automatically the offer in response to the offer including a purchase price that is at most a calculated threshold price, the predetermined threshold price being calculated based on recent transactions.

3. The system of claim 1, wherein said processor is further configured to:
  receive payment from the buyer for an accepted offer; and
  transfer ownership of said at least one of the said one or more accounts having account data that satisfies at least a portion of said selection criteria from a seller to the buyer.

4. The system of claim 1, wherein the account data is not personally-identifiable account data.

5. The system of claim 4, further comprising a credit reporting agency database, said credit reporting agency database comprising personally-identifiable account data, wherein said processor is configured to transfer account data from said credit reporting agency database to said account database.

6. A method, comprising:
  receiving selection criteria for an account;
  searching, by a computer, an account database for one or more accounts having account data that satisfies at least a portion of said selection criteria, wherein said account database comprises account data associated with one or more accounts, each of the one or more accounts representing an account receivable;
  receiving an offer from a buyer for at least one of said one or more accounts having account data that satisfies at least a portion of said selection criteria; and
  accepting automatically the offer in response to the offer fulfilling a term of a commitment for the at least one of said one or more accounts having account data that satisfies at least a portion of said selection criteria, the term of the commitment comprising a fixed price upon which a seller automatically accepts the offer.

7. The method of claim 6, further comprising rejecting automatically the offer in response to the offer including a purchase price being at most a predetermined threshold price.

8. The method of claim 6, further comprising:
  receiving payment from the buyer for an accepted offer; and
  transferring ownership, by the computer, of said at least one of the said one or more accounts having account data that satisfies at least a portion of said selection criteria from a seller to the buyer.

9. The method of claim 6, wherein the account data is not personally-identifiable.

10. The method of claim 6, wherein said account data is transferred to the account database from a credit reporting agency database, said credit reporting agency database comprising personally-identifiable account data.

11. A non-transitory computer program product comprising computer executable code sections, said computer executable code sections for performing the steps of:
  receiving selection criteria for an account;
  searching an account database for one or more accounts having account data that satisfies at least a portion of said selection criteria, wherein said account database comprises account data associated with one or more accounts, each said account representing an account receivable;
  receiving an offer from a buyer for at least one of said one or more accounts having account data that satisfies at least a portion of said selection criteria; and
  accepting automatically the offer in response to the offer fulfilling a term of a commitment for the at least one of said one or more accounts having account data that satisfies at least a portion of said selection criteria, the term of the commitment comprising a fixed price upon which a seller automatically accepts the offer.

12. The computer program product of claim 11, further comprising computer executable code sections for performing the steps of rejecting automatically the offer in response to the offer including a purchase price being at most a predetermined threshold price.

13. The computer program product of claim 11, further comprising computer executable code sections for performing the steps of:
  receiving payment from the buyer for an accepted offer; and
  transferring ownership of said at least one of the said one or more accounts having account data that satisfies at least a portion of said selection criteria from a seller to the buyer.

14. The computer program product of claim 11, wherein the account data is not personally-identifiable.

15. The computer program product of claim 11, wherein said account data is transferred to the account database from a credit reporting agency database, said credit reporting agency database comprising personally-identifiable account data.

16. The system of claim 3, wherein the processor is further configured to enable settlement of the purchase price.

17. The method of claim 6, further comprising settling the purchase price.

18. The computer program product of claim 11, further comprising computer executable code sections for performing the steps of settling the purchase price.

19. The system of claim 1, wherein the term of the commitment further comprises a minimum time an account is available for purchase, and a maximum price upon which a seller refuses to accept the offer.

* * * * *